May 17, 1932. F. J. HABA 1,859,138
CYLINDER AND CONCAVE FOR THRESHING MACHINES
Filed Aug. 22, 1929 2 Sheets-Sheet 1
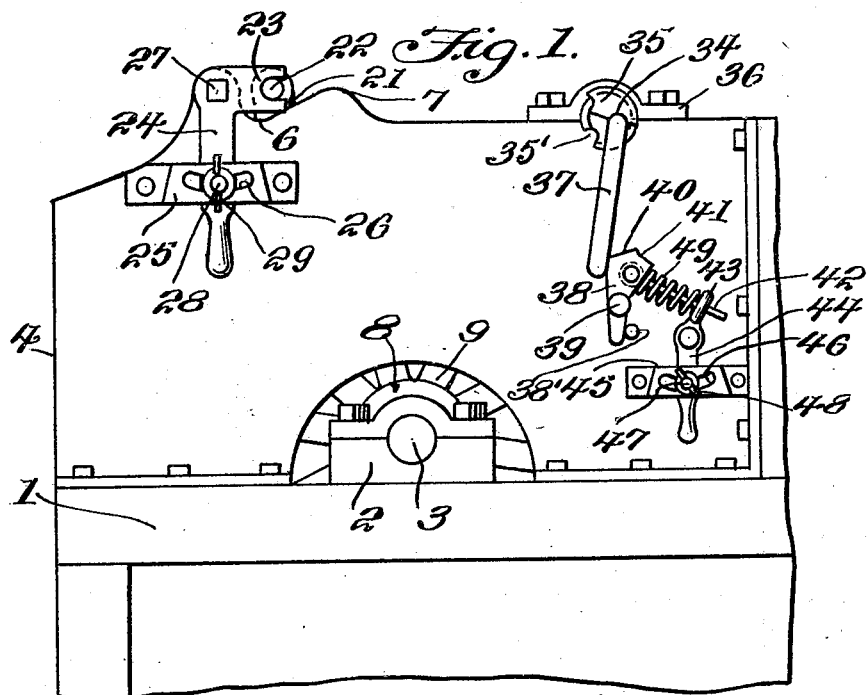
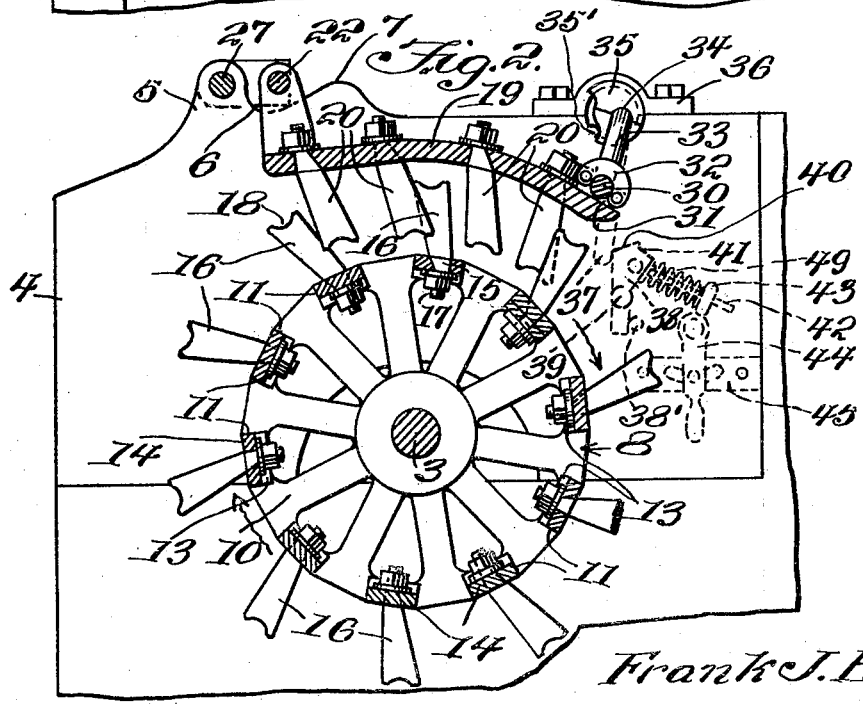
Frank J. Haba
INVENTOR
BY Victor J. Evans
ATTORNEY
WITNESS J. T. L. Wright May 17, 1932. F. J. HABA 1,859,138
CYLINDER AND CONCAVE FOR THRESHING MACHINES
Filed Aug. 22, 1929 2 Sheets-Sheet 2
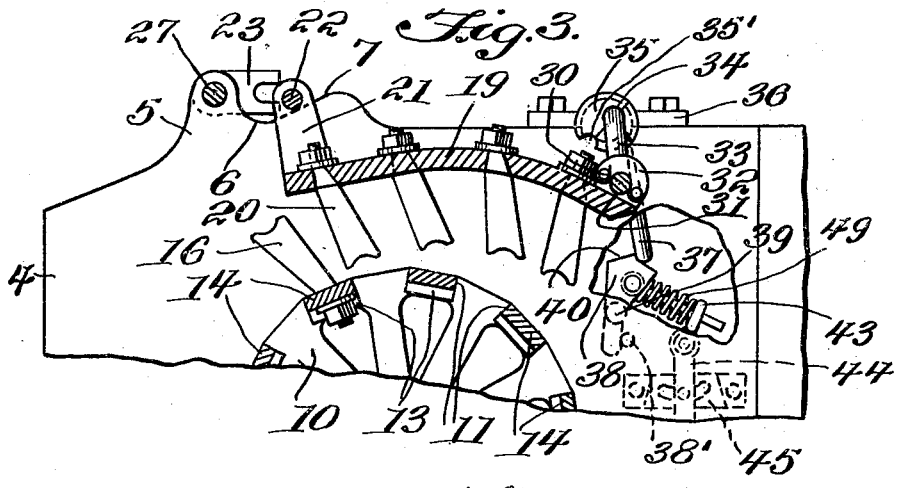
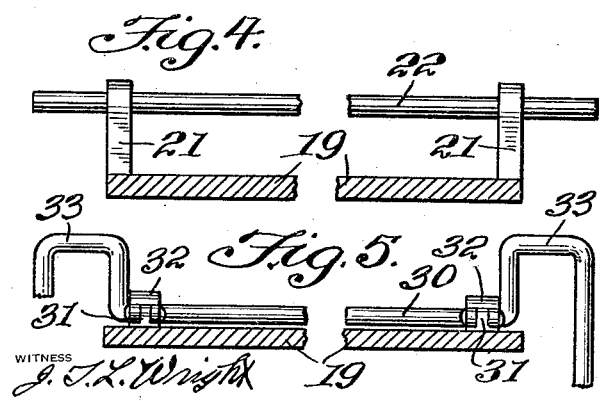
Frank J. Haba
INVENTOR
BY Victor J. Evans
ATTORNEY Patented May 17, 1932

1,859,138

UNITED STATES PATENT OFFICE

FRANK J. HABA, OF CALDWELL, KANSAS

CYLINDER AND CONCAVE FOR THRESHING MACHINES

Application filed August 22, 1929. Serial No. 387,617.

My present invention has reference to grain threshing machines and is particularly directed to a new and novel construction of cylinder and concave for such threshers.

A still further and important object resides in the mount for the concave which will permit of the same moving away from the cylinder should an obstruction be found in the straw, which automatically returns the concave to a position where the same will not fall on the cylinder after such obstruction has passed the concave or ejected from the machine and which is adjustable to regulate the position of the teeth of the concave with respect to those of the cylinder.

A further object is the provision of means whereby, when the concave is adjusted with respect to the cylinder, the distance between the teeth of the concave and cylinder is likewise adjusted.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claims.

In the drawings:

Figure 1 is a side elevation of a sufficient portion of the box or body of a thresher to illustrate the application of my improvement thereon.

Figure 2 is an approximately central longitudinal sectional view therethrough.

Figure 3 is a sectional view substantially similar to Figure 2, but illustrating the manner in which the concave moves away from the cylinder when an obstacle is contacted by the teeth of the concave.

Figure 4 is a sectional view through the front or forward end of the concave to illustrate the shaft thereon.

Figure 5 is a similar view through the rear of the concave.

Figure 6 is a detail elevation to illustrate the manner in which the rear shaft of the concave is removably latched thereto.

In the drawings the numeral 1 designates a sufficient portion of the body of a threshing machine to illustrate the application of my improvement thereon. The body 1 has its sides provided with the usual alining semi-cylindrical openings on whose lower and flat faces there are fixed the bearings 2 for the shaft 3 of the cylinder.

The top of the body is open, and the sides thereof have their upper edges above the feeder end 4 formed with upstanding portions 5 and with rounded depressions 6 that are continued from the outer walls of the said upstanding portions, the wall 6 being upwardly extended to provide the sides of the body 1 with cam-shaped tracks 7, whose purpose will presently be described.

The body of the cylinder 8 comprises end wheels 9 and a central wheel 10 through all of which the shaft 3 extends and to which the said shaft is fixed. However, if desired, the shaft may be in the nature of trunnions and extend only from the end wheels 9. The end wheels 9 are peripherally formed with equidistantly spaced angularly arranged notches 11, the said notches being arranged between the spokes of the wheels, and the inner faces of the wheels 9, in a line with the notches 11 are formed with inwardly directed elements in the nature of ledges 12. The center wheel 10 is also formed with equidistantly spaced series of peripheral notches, but these notches are arranged out of the plane of the notches 11 and are consequently arranged angularly with respect to the notches 11.

The concave, which is arranged above the cylinder, in counter distinction to the usual construction of devices of this character, is indicated by the numeral 19, and this concave carries series of teeth 20 which are of a similar construction as the teeth previously described and which are connected thereto in the same manner as the teeth 16 are secured to the cylinder. The active faces or bodies of the teeth 20 incline rearwardly from the forward end of the concave 19.

The forward end of the concave 19 has fixedly secured to the top face thereof upstanding brackets 21, between which there is passed and fixed a shaft 22. The shaft is arranged directly over the rounded depressions or concavities on the inner surface of the cam track 7 when the concave is in normal position as disclosed by Figure 2 of the drawings. On the elevated sides of the body to the rear of the cam track there is journaled a shaft 27. Fixed on each of the ends of the shaft there are members having notched ends 23 that are designed to normally receive the ends of the shaft 22 in the notches thereof. One of the members 23 is formed with a depending arm in the nature of a lever 24. The lever 24 passes through a bracket 25, the said bracket having an arcuate slot 26 and the lever has a threaded pin or stud 28 which passes through the slot. The stud or pin 28 is engaged by a wing nut 29. By this arrangement it will be noted that the adjustment of the lever 24 permits of the raising or lowering of the front end of the concave 19.

On the top and at the rear of the concave 19 there is a transversely arranged shaft 30. This shaft is held on the concave by bearings which include a lower fixed section 31 and an upper pivoted section 32. The pivoted section has both of its ends bifurcated and is swingable over one of the rounded ends of the fixed sections and there is designed to be passed through both of these ends a removable pivot pin. In this manner it will be noted that the concave may be removed from the thresher and replaced by another concave when desired.

The shaft 30 has its ends cranked, as at 33, and the outwardly extending portions of these cranked ends are received in eccentrically arranged bearing openings 34 in wheels or rollers 35 that are mounted for turning in bearings 36 on the top and at the sides of the body 1. The rollers 35 are peripherally grooved and are preferably formed each of two meeting sections. The bearing portion of the cranked ends of the shaft 30 are bent, or otherwise formed with arms 37 which extend downwardly along the sides of the body 1. Each of the arms 37 is contacted by the straight and what I will term rear edge of a dog 38 the body of which is pivoted, as at 39, to the side of the body 1. The upper end of each dog is extended at an elevated angle as indicated by the numeral 40, the corners at their juncture of the angle edges or walls and the body of the dogs being notched, as at 41. Each dog slightly below its active end, or the portion thereof provided with the notch 41 has pivotally secured thereto a rod 42. Each rod passes through the eye end 43 of a lever 44 which is pivoted to the respective sides of the body 1, and each lever is guided through a bracket 45. Each bracket 45 has an arcuate slot 46 and each lever has an outwardly extending threaded stem 47 that is received through the slot 46. Each threaded stem is engaged by a winged nut 48.

By adjusting the pivoted levers 44 the tension of springs 49 which are arranged between the eye ends 43 of the levers and the dogs 38 will be regulated and consequently more or less pressure will be exerted by the spring influenced dogs against the arms 37, with the result that the eccentrically mounted shaft 30 which is connected to the concave 19 will be moved vertically, with the result that the teeth on the concave will be adjusted with respect to the teeth on the cylinder.

Should an obstruction be mixed with the straw that is threshed between the teeth 16 and 20, such obstruction will contact, or be brought into contact with the teeth 20 at the front end of the concave. This will cause the concave to be moved bodily in a rearward direction as disclosed by Figure 3 of the drawings, causing the ends of the shaft 22 to be brought out of the notches in the members 23, and permitting the ends of the shaft 22 travel upwardly on the cam tracks 7 which will also cause the rear of the concave to be moved upwardly, as the same will exert a pressure upon the crank shaft to cause the eccentrically mounted wheels or rollers to move the said shaft in an upward direction. This will cause the arms 37 to travel upwardly over the surfaces 40 and to be received in the notches 41 so that the concave will be held a determined distance above the cylinder but will also be sustained in a position so that the same may be manually returned to its initial position. Thus it will be seen that an obstacle between the teeth of the concave and the cylinder can inflict no injury to either of these elements.

It is believed the foregoing description, when read in connection with the accompanying drawings will clearly set forth my construction and the advantages thereof to those skilled in the art to which the invention relates and that further detailed description will not be required.

Having described the invention, I claim:

1. A concave structure for an overshot threshing cylinder comprising a concaved body spaced above the cylinder, a crank shaft journaled above the cylinder and pivotally supporting the rear edge of said body and capable of raising the rear of the body, means for supporting the forward portion of the body and capable of permitting the body to move rearwardly and upwardly, a spring pressed dog engageable with said shaft for holding the rear of the body at an elevated position and manually operable means for setting the dog and adjusting the tension of the spring.

2. A concave structure for an overshot threshing cylinder comprising a concaved body spaced above the cylinder, a crank shaft freely journaled for rotation above the cylinder and pivotally supporting the rear edge of the body and capable of raising the rear of the body, means resiliently holding the shaft at normal position and means for supporting the forward portion of the body and capable of permitting the body to slide and move rearwardly and upwardly.

3. A concave structure for an overshot threshing cylinder comprising a concaved body spaced above the cylinder, a crank shaft journaled above the cylinder pivotally supporting the rear edge of the body and capable of raising the rear of the body, means supporting the forward portion of the body and capable of permitting the body to slide and move rearwardly and upwardly and a spring pressed dog for holding the shaft and rear portion of the body at normal position.

In testimony whereof I affix my signature.

FRANK J. HABA.